Nov. 15, 1966    R. W. BLAIR    3,286,231
VEHICLE HAND BRAKE AND GENERATOR SIGNAL SYSTEM
Filed June 11, 1964    2 Sheets-Sheet 2
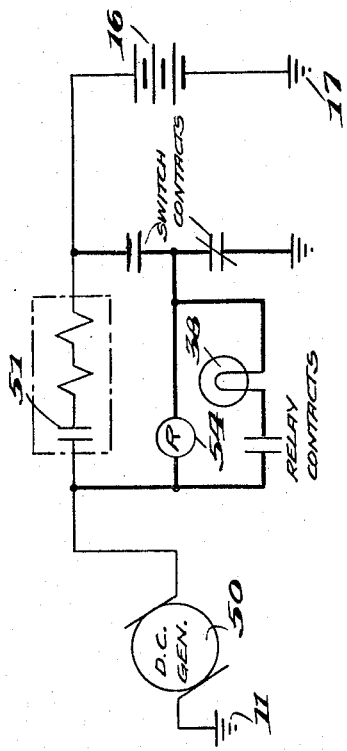
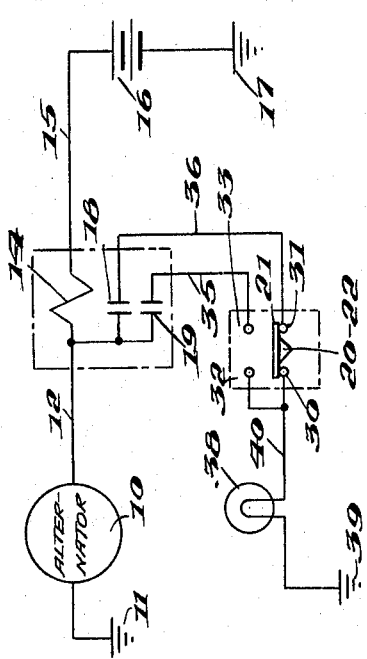
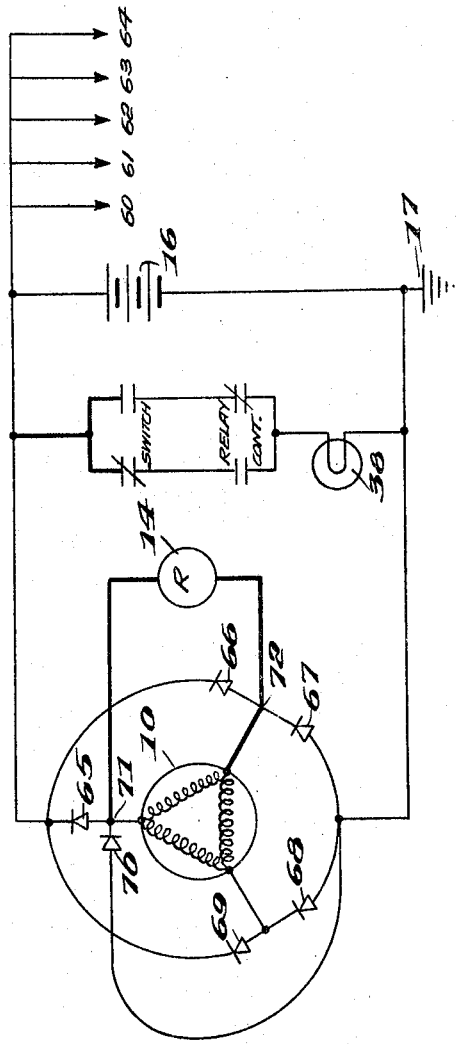
INVENTOR
ROLLA W. BLAIR,
BY Stone & Mack
ATTORNEYS

United States Patent Office 3,286,231
Patented Nov. 15, 1966

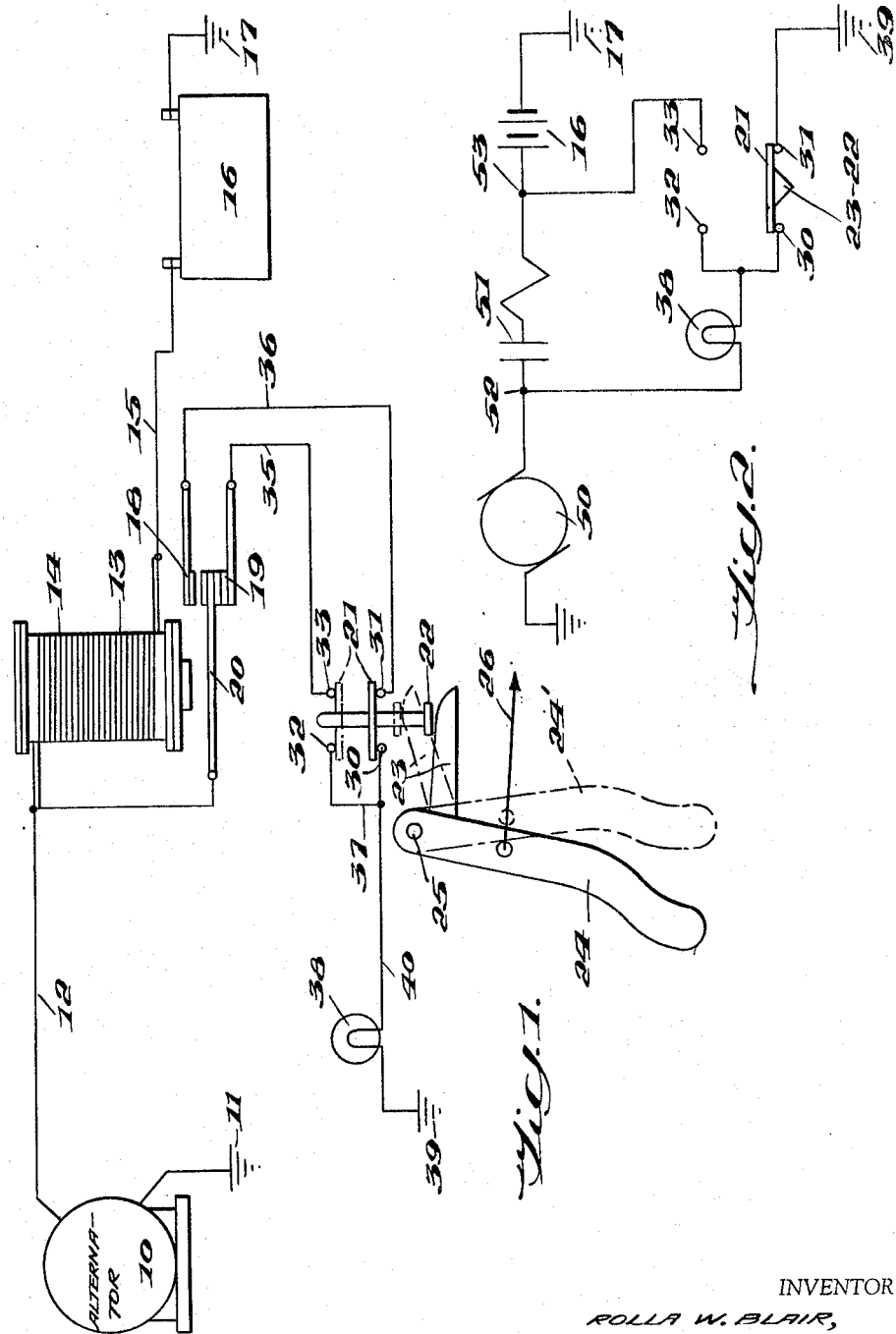

3,286,231
VEHICLE HAND BRAKE AND GENERATOR
SIGNAL SYSTEM
Rolla W. Blair, 507 36th St., Vienna, W. Va.
Filed June 11, 1964, Ser. No. 374,482
7 Claims. (Cl. 340—69)

This invention relates to an improved brake signal for automobiles and has, for one of its principal objects, means for automatically indicating to the operator of an automobile the position of the hand brake sometimes referred to as the emergency or parking brake.

One of the principal objects of the invention is to provide a means whereby the operator will be warned by a signal in the automobile should he fail to set the hand brake when the automobile has been stopped and the motor is not running.

Another object of the invention is to provide a means whereby the operator will be warned by the same signal as above, should be fail to release the hand brake after the motor is running, whereby the operator will be prevented from driving the automobile without first releasing the hand brake.

Another object of the invention is to make use of the above signal to indicate when there is no charging current to the battery even through the motor is running and the hand brake is released thus showing that there is a failure of the alternating generator to generate current.

Another object of the invention is to provide a device using the same signal to indicate that the hand brake is set when it should have been released and that the brake has not been set when it should have been.

Still another object of the invention is to provide a device which employs the generated current to initiate the control signal of a hand brake position-indicating signal.

A further object of the invention is to provide a two-position switch whereby one circuit is closed in one position of said switch and another circuit is closed in the other position of said switch to control a hand brake position-indicating signal.

Another object of the invention is to provide a signaling system which will not in any manner interfere with the normal use of the controlling mechanism of the automobile and one which may be quickly installed and operatively related to the influencing parts of the mechanism of the automobile with which the same is to be used.

The full nature of the invention will be understood from the following specification and the accompanying drawings in which:

FIGURE 1 is a diagrammatic view, illustrating the electrical connections and installation of the improved brake signal of this invention;

FIGURE 2 is an elementary diagrammatic view illustrating the electrical connections employed when a direct current generator is used;

FIGURE 3 is an elementary diagrammatic view illustrating the electrical connections employed when an alternator is used;

FIGURE 4 is a diagrammatic view showing a basic automobile power circuit which has been modified to include the devices herein described; and FIGURE 5 is a diagrammatic view showing a basic automobile power circuit which has been modified to include the devices herein described in connection with a direct current generator.

The following description presumes a motor driven automobile having a storage battery, for starting the motor and other uses, and a direct current generator or alternator for charging said battery with the necessary wiring to said battery. The description also presumes a hand or parking brake for holding the automobile stationary when it is not in use.

Automobiles in use today are using two types of generators; the direct current generator and the alternating current generator or alternator. Alternators may be either single phase or polyphase. The alternator furnishes all electrical energy for the automobile and its electrical devices; it also charges the battery the energy from which is made use of when the alternator is not running. As the description proceeds, more will be said concerning the alternator.

As shown in the drawings:

The reference numeral 10 designates a generator mounted on the automobile and driven by the motor thereof. The generator is of the alternating current type known as an alternator and is in common use on automobiles today. The frame of the alternator is grounded to the frame of the automobile at 11 and a circuit 12 permits current to flow through the coil 14 of the relay 13 and thence by circuit 15 to battery 16 and to ground 17. The coil 14 is made of a conductor with sufficient current carrying capacity to carry the full load current of the alternator continuously and with enough turns of the conductor around the core to keep the relay in its energized position with the minimum current of the alternator when the motor is running at reasonable idling speed. The relay contacts are two in number, 18 and 19. The contact 18 is arranged to be closed when the coil 14 is carrying current and open when the coil 14 is not carrying current. The other contact 19 is arranged to be open when the coil 14 is carrying current and closed when the coil 14 is not carrying current. The armature 20 of the relay is adapted to contact either contact 18 or contact 19 when actuated by the coil 14 in a manner conventional to relays.

A single pole double-throw switch 21 is mounted on the automobile and is adapted to be moved from one position to another when a projecting part 23 on the hand brake 24 contacts element 22 as the hand brake swings about its pivot 25 from the set position 24 to the released position 24'. Element 26 is attached to the hand brake and usually takes the form of a cable leading to the brake (not shown). The switch 21 is provided with two sets of contacts 30–31 and 32–33. When the hand brake is moved to its brake set position 24, part 23 permits element 22 to move to its normally closed position thus causing switch 21 to bridge the contacts 30–31. When the hand brake is moved to its released position 24', part 23 pushes upwardly against element 22 thus causing switch 21 to bridge the contacts 32–33. Contacts 31 and 18 are connected by conductor 36. Contacts 33 and 19 are connected by conductor 35. Contact 32 is connected by conductors 37 and 40 to signal lamp 38 and ground 39. Contact 30 is connected by conductor 40 to signal lamp 38 and ground 39. The signal lamp 38 may be supplanted by any visual or audible device which will operate when connected to battery voltage.

The relay 13 is connected in the charging circuit between the alternator 10 and the battery 16 so that current generated by the alternator when the motor is running must flow through coil 14 of the relay.

The switch 21 may be attached to the automobile in any convenient location that will permit the hand brake to activate the switch operating device 22–23 so that 32–21–33 is closed when the hand brake is released but open when the hand brake is set and 30–21–31 is open when the hand brake is released but closed when the hand brake is set. The connections being made as shown, if 18–20 and 30–21–31 are both closed, the signal lamp 38 will be activated; if 19–20 and 32–21–33 are both closed the signal lamp 38 will be activated. When the motor is running 18–20 are closed and should the hand brake be set, 30–21–31 are closed and the signal lamp 38 will be activated. Releasing the hand brake opens 30–21–31 and deactivates the signal lamp 38. When the motor is not running 19–20 are closed and should the hand brake not be set 32–21–33 are closed and the signal lamp 38 is activated. The setting of the hand brake opens 32–21–33 and deactivates the signal lamp 38.

An additional feature of this signaling device and the circuitry therefor is that if there is no charging current to the battery 16 when the motor is running and the hand brake is released, the signal lamp 38 will operate to show a failure of the alternator to generate current.

For those vehicles that are still in use and employ a direct current generator 50 (FIGURE 2) the relay 13 is unnecessary and the electrical connections are made as shown diagrammatically in FIGURE 2. The function of the relay 13 is absorbed by the cut-out contacts of the voltage regulator 51 which needs no description and forms no part of this invention, it being well known in the art. The single pole double throw switch 21 actuated precisely in the manner pertaining to FIGURE 1 and the signal lamp 38 are all that is necessary. However, it is important that the connections 52 and 53 be made on opposite sides of the voltage regulator.

FIGURE 3 is an elementary diagram having reference to FIGURE 1 and all elements shown therein function precisely as do the elements in FIGURE 1. The single pole double throw switch 21 is adapted to be actuated by the hand brake 24 of FIGURE 1.

FIGURE 4 is an elementary diagram having reference to FIGURE 1 but showing how the relay 13 may be connected to the windings of the alternator 10. The alternator 10 furnishes all electric power for the automobile and its electrical devices 60–64 such as the ignition, lights, radio, fans, etc. The alternator also furnishes current for charging the battery which stores the energy for use when the alternator is not running. Since a battery cannot be charged with alternating current the alternator is provided with diode rectifiers 65–70 which rectifiers convert the alternating current into direct current in a manner well known in the art. The diode rectifiers permit current to flow through them in one direction but prevent it from flowing in the opposite direction and they are connected in the alternator circuit, as shown, so that a path is provided for all currents generated to flow to the battery 16 and to prevent any current to flow from the battery to the alternator. The coil 14 of the relay 13 is connected to any two terminals 71–72 of the alternator between the alternator windings and the diodes. The relay contacts 18 and 19, the switch 21 and its contacts 30–31 and 32–33 and the signal lamp 38 are connected to the battery circuit as shown. The switch 21 is actuated by the hand brake as in FIGURE 1 so that the switch contacts that are open when the hand brake is set must be connected in series with the relay contact that is closed when the relay coil is not energized. The switch contacts that are open when the hand brake is released must be connected in series with the relay contacts that are closed when the relay coil is energized.

This arrangement will cause the signal lamp to operate as follows:

Motor not running; brake set; no signal.
Motor running; brake set; signal.
Motor running; brake released; no signal.
Motor not running; brake released; signal.

FIGURE 5 shows a basic automobile power circuit which has been modified to include the devices herein described for use with a direct current generator 50.

The relay 54 and the relay contacts are not absolutely essential but when employed they will prevent the signal lamp 38 from glowing slightly at motor idling speeds.

While certain specific embodiments of an improved brake signal device for automobiles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A safety hand brake position-indicating signal for motor vehicles comprising in combination:
    (a) a signal lamp disposed so that it is visible to the operator of said vehicle,
    (b) a relay provided with an energizing coil which is arranged to actuate the armature thereof to contact one or the other of a pair of contacts, one of said contacts being arranged to be closed when the coil is energized and open when the coil is not energized,
    (c) the other of said contacts being arranged to be open when the coil is energized and closed when the coil is not energized, said contacts being electrically connected by individual circuits with said signal lamp for passing an electrical current thereto,
    (d) a power supply, a hand brake operated single pole double throw switch mounted on said vehicle and electrically connected in series with the contact that is arranged to be closed when said coil is energized so that current will flow through said hand brake operated switch in the position it has taken when the motor is running and the hand brake is set whereby a circuit to said signal lamp will be established and said signal lamp energized to indicate that the brake is set when it should have been released.

2. A safety hand brake position-indicating signal for motor vehicles comprising in combination:
    (a) a signal lamp disposed so that it is visible to the operator of said vehicle,
    (b) a relay provided with an energizing coil which is arranged to actuate the armature thereof to contact one or the other of a pair of contacts, one of said contacts being arranged to be closed when the coil is energized and open when the coil is not energized,
    (c) the other of said contacts being arranged to be open when the coil is energized and closed when the coil is not energized, said contacts being electrically connected by individual circuits with said signal lamp for passing an electrical current thereto,
    (d) a power supply, a hand brake operated single pole double throw switch mounted on said vehicle and electrically connected in series with the contact that is arranged to be closed when said coil is not energized so that current will flow through said hand brake operated switch in the position it has taken when the motor is not running and the hand brake is released whereby a circuit to said signal lamp will be established and said signal lamp energized to indicate that the brake is released when it should have been set.

3. A safety hand brake position-indicating signal for motor vehicles comprising in combination:
    (a) a signal lamp disposed so that it is visible to the operator of said vehicle,
    (b) a relay provided with an energizing coil which is arranged to actuate the armature thereof to contact one or the other of a pair of contacts, one of said contacts being arranged to be closed when the coil is energized and open when the coil is not energized,
    (c) the other of said contacts being arranged to be open when the coil is energized and closed when the coil is not energized, said contacts being electrically connected by individual circuits with said signal lamp for passing an electrical current thereto,
    (d) a power supply, a hand brake operated single pole double throw switch mounted on said vehicle and electrically connected in series with the contact that is arranged to be closed when said coil is not energized so that current will not flow through said hand brake operated switch in the position it has taken when the motor is not running and the hand brake is set whereby no circuit to said signal lamp will be established and said signal lamp will not be energized.

4. A safety hand brake position-indicating signal for motor vehicles comprising in combination:
  (a) a signal lamp disposed so that it is visible to the operator of said vehicle,
  (b) a relay provided with an energizing coil which is arranged to actuate the armature thereof to contact one or the other of a pair of contacts, one of said contacts being arranged to be closed when the coil is energized and open when the coil is not energized,
  (c) the other of said contacts being arranged to be open when the coil is energized and closed when the coil is not energized, said contacts being electrically connected by individual circuits with said signal lamp for passing an electrical current thereto,
  (d) a power supply, a hand brake operated single pole double throw switch mounted on said vehicle and electrically connected in series with the contact that is arranged to be closed when said coil is energized so that current will not flow through said hand brake operated switch in the position it has taken when the motor is running and the hand brake is released whereby no circuit to said signal lamp will be established and said signal lamp will not be energized.

5. A safety hand brake position-indicating signal for motor vehicles comprising in combination:
  (a) a signal lamp disposed so that it is visible to the operator of said vehicle,
  (b) a relay provided with an energizing coil which is arranged to actuate the armature thereof to contact one or the other of a pair of contacts, one of said contacts being arranged to be closed when the coil is energized and open when the coil is not energized,
  (c) the other of said contacts being arranged to be open when the coil is energized and closed when the coil is not energized, said contacts being electrically connected by individual circuits with said signal lamp for passing an electrical current thereto,
  (d) a power supply, a hand brake operated two-position switch electrically connected with said circuits so that in one position one circuit will be closed and in the other position the other of said circuits will be closed whereby a circuit to said signal lamp will be established and the brake position will be indicated thereby.

6. A safety hand brake position-indicating signal for motor vehicles comprising in combination:
  (a) a signal lamp disposed so that it is visible to the operator of said vehicle,
  (b) a relay provided with an energizing coil which is arranged to actuate the armature thereof to contact one or the other of a pair of contacts, one of said contacts being arranged to be closed when the coil is energized and open when the coil is not energized,
  (c) the other of said contacts being arranged to be open when the coil is energized and closed when the coil is not energized, said contacts being electrically connected by individual circuits with said signal lamp for passing an electrical current thereto,
  (d) a power supply, a hand brake operated two-position switch electrically connected with said circuits so that in one position one circuit will be closed through said signal lamp whereby to indicate that said brake is set when it should have been released and in the other position the other of said circuits will be closed through the same signal lamp whereby to indicate that said brake has not been set whereas it should have been.

7. A safety hand brake position-indicating signal for motor vehicles comprising in combination:
  (a) a signal lamp disposed so that it is visible to the operator of said vehicle,
  (b) a means for generating current,
  (c) a relay provided with an energizing coil which is arranged to actuate the armature thereof to selectively contact a pair of contacts to initiate, through the medium of the generated current, a control signal which is sent over individual circuits including said contacts to said signal lamp,
  (d) a power supply, a hand brake operated two-position switch electrically connected with said circuits so that in one position one circuit will be closed through said signal lamp whereby to indicate that said brake is set when it should have been released and in the other position the other of said circuits will be closed through the same signal lamp whereby to indicate that said brake has not been set whereas it should have been.

No references cited.

NEIL C. READ, *Primary Examiner.*

A. H. WARING, *Assistant Examiner.*